(12) United States Patent
Hong

(10) Patent No.: US 11,382,032 B2
(45) Date of Patent: Jul. 5, 2022

(54) CELL ACCESS METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/956,152

(22) PCT Filed: Dec. 21, 2017

(86) PCT No.: PCT/CN2017/117777
§ 371 (c)(1),
(2) Date: Jun. 19, 2020

(87) PCT Pub. No.: WO2019/119357
PCT Pub. Date: Jun. 27, 2019

(65) Prior Publication Data
US 2020/0344681 A1    Oct. 29, 2020

(51) Int. Cl.
*H04W 48/18* (2009.01)
*H04W 48/08* (2009.01)
*H04W 64/00* (2009.01)

(52) U.S. Cl.
CPC ........... *H04W 48/18* (2013.01); *H04W 48/08* (2013.01); *H04W 64/006* (2013.01)

(58) Field of Classification Search
CPC combination set(s) only.
See application file for complete search history.

(56) References Cited

U.S. PATENT DOCUMENTS

| 2009/0117905 A1* | 5/2009 | Watanabe | H04W 48/20 455/437 |
| 2015/0141021 A1* | 5/2015 | Kapoulas | H04W 36/0094 455/441 |
| 2015/0373599 A1* | 12/2015 | Kim | H04W 36/32 370/331 |

(Continued)

FOREIGN PATENT DOCUMENTS

| CN | 101583169 A | 11/2009 |
| CN | 102647766 A | 8/2012 |

(Continued)

OTHER PUBLICATIONS

International Search Report dated Jun. 28, 2018 in PCT/CN2017/117777 filed on Dec. 21, 2017, 2 pages.

(Continued)

*Primary Examiner* — Steven S Kelley
(74) *Attorney, Agent, or Firm* — Oblon, McClelland, Maier & Neustadt, L.L.P.

(57) ABSTRACT

The present disclosure provides a cell access method and device. The method is applied to a base station and can include generating RRC information that is used for instructing a terminal to determine a speed state of the terminal and a cell type of a cell to be accessed. The method can further include sending the RRC information to the terminal, so that the terminal determines the speed state and the cell type according to the RRC information and initiates access to the cell to be accessed when determining that the speed state and the cell type meet a preset cell access condition.

16 Claims, 12 Drawing Sheets

(56) References Cited

U.S. PATENT DOCUMENTS

| | | | |
|---|---|---|---|
| 2016/0255564 A1 | 9/2016 | Yang et al. | |
| 2016/0360537 A1* | 12/2016 | Palenius | H04W 72/02 |
| 2018/0160418 A1* | 6/2018 | Luo | H04W 72/1263 |
| 2020/0236605 A1* | 7/2020 | Yiu | H04W 36/24 |
| 2020/0275354 A1* | 8/2020 | Hong | H04W 48/04 |
| 2020/0288376 A1* | 9/2020 | Hong | H04W 24/10 |
| 2020/0296655 A1* | 9/2020 | Hong | H04W 48/08 |
| 2020/0359303 A1* | 11/2020 | Hong | H04W 48/12 |
| 2021/0007044 A1* | 1/2021 | Hong | H04W 36/00837 |
| 2021/0058855 A1* | 2/2021 | Hong | H04W 48/10 |
| 2021/0185591 A1* | 6/2021 | Hong | H04W 48/04 |
| 2021/0250837 A1* | 8/2021 | Hong | H04W 64/006 |

FOREIGN PATENT DOCUMENTS

| | | |
|---|---|---|
| CN | 102711222 A | 10/2012 |
| CN | 103517274 A | 1/2014 |
| CN | 103906193 A | 7/2014 |
| CN | 104918258 A | 9/2015 |
| CN | 105554829 A | 5/2016 |
| CN | 106304172 A | 1/2017 |
| CN | 106332197 A | 1/2017 |
| WO | WO 2011/040123 A1 | 4/2011 |

OTHER PUBLICATIONS

Chinese Office Action dated Apr. 3, 2019 in Chinese Patent Application No. 201780002321.7, 10 pages.
Chinese Office Action dated Jul. 2, 2019 in Chinese Patent Application No. 201780002321.7, 6 pages.
Chinese Office Action dated Sep. 25, 2019 in Chinese Patent Application No. 201780002321.7, 3 pages.

* cited by examiner

CELL ACCESS METHOD AND APPARATUS

CROSS-REFERENCE

This application is a national phase application under 35 U.S.C. § 371 of International Patent Application No. PCT/CN2017/117777, filed on Dec. 21, 2017.

TECHNICAL FIELD

The present disclosure relates to the field of communication technologies, and in particular, to a cell access method and device.

BACKGROUND

With the rapid development of high-speed railway technology and the rapid deployment of high-speed railway, more and more users will travel by the high-speed railway. In order to meet communication needs of mobile users on the high-speed railway and to ensure communication qualities of the mobile users on the high-speed railway, communication operators have deployed a high-speed railway dedicated network to specifically serve the mobile users on high-speed railway. Depending on frequency resources in different regions, the high-speed railway dedicated network and an ordinary public long term evolution (LTE) network may use same frequency or different frequencies. However, because the high-speed railway dedicated network usually has better coverage, user equipment not on the high-speed railway often access to the high-speed railway dedicated network, especially in urban areas with a large population, which is likely to cause congestion of the high-speed railway dedicated network, thereby affecting the communication quality of the mobile users on the high-speed railway.

SUMMARY

Embodiments of the present disclosure provide a cell access method and device. According to a first aspect of the present disclosure, there is provided a cell access method, which is applied to a base station. The cell access method can include generating RRC information that is configured to instruct a terminal to determine a speed state of the terminal and a cell type of a cell to be accessed, and sending the RRC information to the terminal, so that the terminal determines the speed state and the cell type according to the RRC information, and initiates access to the cell to be accessed when determining that the speed state and the cell type meet a preset cell access condition.

Optionally, the RRC information can include specified threshold information for instructing the terminal to determine the speed state. Additionally, the RRC information can further include a specified number of equivalent cells, and the specified number of equivalent cells is a number of equivalent cells corresponding to the cell to be accessed, and is configured to instruct the terminal to determine that the cell type is the cell served by a high-speed railway dedicated network.

The specified threshold information can include a specified duration for evaluating the speed state, a first number range of cell reselection times corresponding to a high speed state and a second number range of cell reselection times corresponding to a low speed state. Optionally, the specified threshold information can further include a third number range of cell reselection times corresponding to a medium speed state.

Additionally, the step of sending the RRC information to the terminal can further include sending and adding the RRC information to system information, and sending the system information to the terminal so that the terminal obtains the RRC information from the system information. Optionally, the system information is specifically a system information block SIB3.

According to a second aspect of the embodiments of the present disclosure, there is provided a cell access method, which is applied to a terminal. The cell access method can include receiving RRC information sent by a base station, wherein the RRC information is configured to instruct the terminal to determine a speed state of the terminal and a cell type of a cell to be accessed, determining the speed state and the cell type according to the RRC information, and initiating access to the cell to be accessed when determining that the speed state and the cell type meet a preset cell access condition. The RRC information can include specified threshold information for instructing the terminal to determine the speed state.

The step of determining the speed state and the cell type according to the RRC information can include determining the speed state according to the specified threshold information, and determining the cell type as a cell of a long-term evolution (LTE) network in response to that the RRC information includes only the specified threshold information.

Optionally, the RRC information further includes a specified number of equivalent cells, the specified number of equivalent cells is a number of equivalent cells corresponding to the cell to be accessed, and the specified number of equivalent cells is configured to instruct the terminal to determine that the cell type is the cell served by a high-speed railway dedicated network.

The step of determining the speed state and the cell type according to the RRC information can further include determining the cell type as the cell served by the high-speed railway dedicated network according to the specified number of equivalent cells, and replacing a number of reselection times of the cell to be accessed with the specified number of equivalent cells. Further, the specified threshold information can include a specified duration for evaluating the speed state, a first number range of cell reselection times corresponding to a high speed state and a second number range of cell reselection times corresponding to a low speed state.

The step of determining the speed state according to the specified threshold information can include obtaining a number of the cell reselection times of the terminal within the specified duration, determining the speed state as the high speed state when the number of the cell reselection times is within the first number range of cell reselection times, and determining the speed state as the low speed state when the number of the cell reselection times is within the second number range of cell reselection times. Additionally, the specified threshold information further includes a third number range of cell reselection times corresponding to a medium speed state.

The step of determining the speed state according to the specified threshold information can further include determining the speed state as the medium speed state when the number of the cell reselection times is within the third number range of cell reseection times. Optionally, the preset cell access condition can include the speed state being a high speed state, and the cell type being the cell served by a high-speed railway dedicated network or the speed state being a low speed state, and the cell type being the cell of a LTE network.

The step of initiating access to the cell to be accessed when determining that the speed state and the cell type meet preset a cell access condition can include initiating the access to the cell to be accessed when determining that the speed state is the high speed state and the cell type is the cell served by the high-speed railway dedicated network, and initiating the access to the cell to be accessed when determining that the speed state is the low speed state and the cell type is the cell of the LTE network. Optionally, the preset cell access condition can further include the speed state being a medium speed state, and the cell type being the cell served by the high-speed railway dedicated network.

The step of initiating access to the cell to be accessed when determining that the speed state and the cell type meet the preset cell access condition can further include initiating the access to the cell to be accessed when determining that the speed state is the medium speed state and the cell type is the cell served by the high-speed railway dedicated network. Additionally, the cell access method can further include determining not to initiate the access to the cell to be accessed when determining that the speed state and the cell type do not meet the preset cell access condition.

According to a third aspect of the present disclosure, there is provided a cell access device, which is applied to a base station. The cell access device can include an information generating module that is configured to generate radio resource control (RRC) information, wherein the RRC information is configured to instruct a terminal to determine a speed state of the terminal and a cell type of a cell to be accessed, and an information sending module that is configured to send the RRC information to the terminal so that the terminal determines the speed state and the cell type according to the RRC information, and initiates access to the cell to be accessed when it is determined that the speed state and the cell type meet a preset cell access condition.

Optionally, the RRC information includes specified threshold information for instructing the terminal to determine the speed state. Additionally, the RRC information can further include a specified number of equivalent cells, and the specified number of equivalent cells is a number of equivalent cells corresponding to the cell to be accessed, and is configured to instruct the terminal to determine that the cell type is the cell served by a high-speed railway dedicated network.

Further, the specified threshold information can include a specified duration for evaluating the speed state, a first number range of cell reselection times corresponding to a high speed state and a second number range of cell reselection times corresponding to a low speed state. In an exemplary embodiment, the specified threshold information can further include a third number range of cell reselection times corresponding to a medium speed state.

Optionally, the information sending module can include an adding sub-module that is configured to send and add the RRC information to system information, and a sending sub-module that is configured to send the system information to the terminal, so that the terminal obtains the RRC information from the system information. In an exemplary embodiment, the system information is specifically a system information block SIB3.

According to a fourth aspect of the embodiments of the present disclosure, there is provided a cell access device, which is applied to a terminal. The cell access device can include an information receiving module that is configured to receive RRC information sent by a base station, wherein the RRC information is configured to instruct a terminal to determine a speed state of the terminal and a cell type of a cell to be accessed, a first determining module that is configured to determine the speed state and the cell type according to the RRC information, and an access module that is configured to initiate access to the cell to be accessed when it is determined that the speed state and the cell type meet a preset cell access condition. Optionally, the RRC information includes specified threshold information for instructing the terminal to determine the speed state.

The first determining module can include a first determining sub-module that is configured to determine the speed state according to the specified threshold information, and a second determining sub-module that is configured to determine the cell type as the cell of a long-term evolution (LTE) network in response to that the RRC information includes only the specified threshold information.

Optionally, the RRC information can further include a specified number of equivalent cells, the specified number of equivalent cells is a number of equivalent cells corresponding to the cell to be accessed, and the specified number of equivalent cells is configured to instruct the terminal to determine that the cell type is the cell served by a high-speed railway dedicated network.

The first determining module can further include a third determining sub-module that is configured to determine the cell type as the cell served by the high-speed railway dedicated network according to the specified number of equivalent cells, and a replacing sub-module that is configured to replace a number of cell reselection times of the cell to be accessed with the specified number of equivalent cells. Optionally, the specified threshold information includes a specified duration for evaluating the speed state, a first number range of cell reselection times corresponding to a high speed state and a second number range of cell reselection times corresponding to a low speed state.

The first determining sub-module can include an obtaining sub-module that is configured to obtain a number of cell reselection times of the terminal within the specified duration, a first state determining sub-module that is configured to determine the speed state as the high speed state when the number of the cell reselection times is within the first number range of cell reselection times, and a second state determining sub-module that can be configured to determine the speed state as the low speed state when the number of the cell reselection times is within the second number range of cell reselection times. Optionally, the specified threshold information further includes a third number range of cell reselection times corresponding to a medium speed state.

The first determining sub-module further includes a third state determining sub-module that is configured to determine the speed state as the medium speed state when the number of the cell reselection times is within the third number range of cell reselection times. Optionally, the preset cell access condition can include the speed state being a high speed state, and the cell type being the cell served by a high-speed railway dedicated network or the speed state being a low speed state, and the cell type being the cell of a LTE network.

The access module can include first access sub-module that is configured to initiate the access to the cell to be accessed when it is determined that the speed state is the high speed state, and the cell type is the cell served by the high-speed railway dedicated network, and a second access sub-module that is configured to initiate the access to the cell to be accessed when it is determined that the speed state is the low speed state, and the cell type is the cell of the LTE network. Optionally, the preset cell access condition further includes: the speed state being a medium speed state, and the cell type being the cell served by the high-speed railway dedicated network.

The access module can further include a third access sub-module that is configured to initiate the access to the cell to be accessed when it is determined that the speed state is the medium speed state, and the cell type is the cell served by the high-speed railway dedicated network. Optionally, the cell access device can further include a second determining module that is configured to determine not to initiate assess to the cell to be accessed when it is determined that the speed state and the cell type do not meet the preset cell access condition.

According to a fifth aspect of the embodiments of the present disclosure, there is provided a non-transitory computer-readable storage medium having a computer program stored thereon. The computer program is configured to perform the cell access method described in the first aspect.

According to a sixth aspect of the embodiments of the present disclosure, there is provided non-transitory computer-readable storage medium having a computer program stored thereon. The computer program is configured to perform the cell access method described in a second aspect.

According to a seventh aspect of the embodiments of the present disclosure, there is provided a cell access device, which is applied to a base station. The cell access device includes a processor and a memory for storing executable instructions of the processor. The processor can be configured to generate RRC information, wherein the RRC information is configured to instruct a terminal to determine a speed state of the terminal and a cell type of a cell to be accessed, and send the RRC information to the terminal, so that the terminal determines the speed state and the cell type according to the RRC information, and initiates access to the cell to be accessed when determining that the speed state and the cell type meet a preset cell access condition.

According to an eighth aspect of an embodiment of the present disclosure, there is provided a cell access device, which is applied to a terminal. The cell access device includes a processor and a memory for storing executable instructions of the processor. The processor can be configured to receive RRC information sent by a base station, wherein the RRC information is configured to instruct a terminal to determine a speed state of the terminal and a cell type of a cell to be accessed, determine the speed state and the cell type according to the RRC information, and initiate access to the cell to be accessed when determining that the speed state and the cell type meet a preset cell access condition.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principle of the present disclosure.

DETAILED DESCRIPTION

Figure 1:
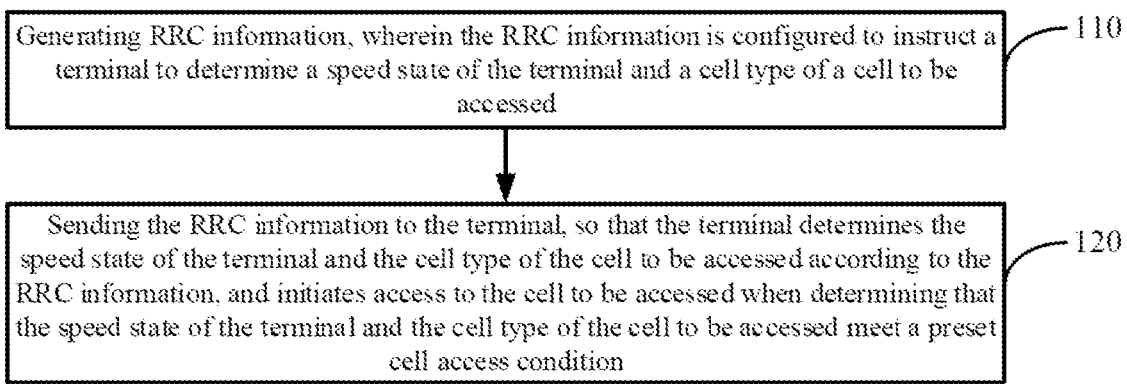
FIG. 1 is a flowchart showing a cell access method according to an exemplary embodiment.

Exemplary embodiments will be described in detail herein, examples of which are illustrated in the accompanying drawings. When the following description is related to the drawings, the same reference numeral in the different figures indicates the same or similar element unless otherwise indicated. The embodiments described in the following exemplary embodiments do not represent all embodiments consistent with the present invention. Instead, they are merely examples of devices and methods consistent with aspects of the present invention as recited in the appended claims.

Terms used in the present disclosure are merely for describing particular embodiments and are not intended to limit the present disclosure. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of associated listed items.

It should be understood that, although the terms first, second, third, and the like may be used in the present disclosure to describe various information, such information should not be limited by these terms. These terms are only used to distinguish the same type of information from each other. For example, without departing from the scope of the present disclosure, first information may also be referred to as second information, and similarly, the second information may also be referred to as the first information. Depending on the context, the term "if" as used herein can be interpreted as "upon" or "when" or "in response to determining".

Figure 2:
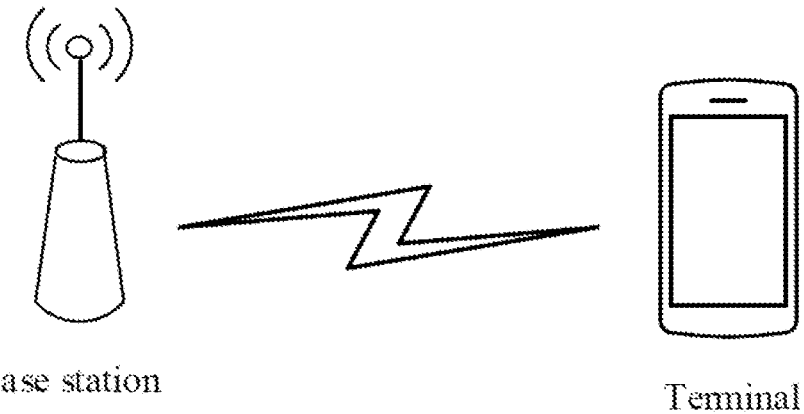
FIG. 2 is a diagram showing an application scenario of a cell access method according to an exemplary embodiment.

FIG. 1 is a flowchart showing a cell access method according to an exemplary embodiment, and FIG. 2 is a diagram showing an application scenario of a cell access method according to an exemplary embodiment. The cell access method may be applied to a base station. As shown in FIG. 1, the cell access method may include the following steps 110-120.

In step 110, radio resource control (RRC) information is generated. The RRC information is configured to instruct a terminal to determine a speed state of the terminal and a cell type of a cell to be accessed. In an embodiment of the present disclosure, the RRC information may be a piece of information defined by the base station to instruct the terminal to determine the speed state of the terminal and the cell type of the cell to be accessed.

In step 120, the RRC information is sent to the terminal, so that the terminal determines the speed state of the terminal and the cell type of the cell to be accessed according to the RRC information, and initiates access to the cell to be accessed when determining that the speed state of the terminal and the cell type of the cell to be accessed meet a preset cell access condition.

As shown in FIG. 2, an exemplary scenario includes a base station and a terminal. The base station may generate the RRC information for instructing the terminal to determine the speed state of the terminal and the cell type of the cell to be accessed in advance, and sends the RRC information to the terminal. The terminal receives the RRC information sent by the base station and can determine the speed state of the terminal and the cell type of the cell to be accessed according to the RRC information. When determining that the speed state of the terminal and the cell type of the cell to be accessed meet the preset cell access condition, the terminal may initiate the access to the cell to be accessed. When determining that the speed state of the terminal and the cell type of the cell to be accessed do not meet the preset cell access condition, the terminal determines not to initiate the access to the cell to be accessed.

As can be seen from the above embodiment, by generating the RRC information configured to instruct the terminal to determine the speed state of the terminal and the cell type of the cell to be accessed and sending the RRC information to the terminal, the base station can instruct the terminal to determine the speed state of the terminal and the cell type of the cell to be accessed according to the RRC information, so that the terminal may access an appropriate cell under instruction of the base station, thereby improving accuracy of cell access. Further, the RRC information in the above step 110 may include specified threshold information for instructing the terminal to determine the speed state.

In an embodiment of the present disclosure, the specified threshold information may be set in advance by the base station according to an actual situation, and is used for the terminal to determine the speed state thereof. The speed state may include a high speed state, and/or a medium speed state, and/or a low speed state, and so on.

As can be seen from the above embodiment, the RRC information may include the specified threshold information for instructing the terminal to determine the speed state, so that the base station instructs the terminal to determine the speed state of the terminal through the specified threshold information, which is convenient for the terminal to access an appropriate cell according to the speed state thereof, thereby improving reliability of cell access.

In addition to the specified threshold information for instructing the terminal to determine the speed state, the RRC information in the above step 110 further includes a specified number of equivalent cells. The specified number of equivalent cells is a number of equivalent cells corresponding to the cell to be accessed. The specified number of equivalent cells is used to instruct the terminal to determine that the cell type is a cell served by a high-speed railway dedicated network.

In an embodiment of the present disclosure, the specified number of equivalent cells may be a value set in advance by the base station according to an actual condition. For example, a value range of the specified number of equivalent cells is 1 to 10.

The high-speed railway dedicated network is very different from a long term evolution (LIE). In the high-speed railway dedicated network, a plurality of radio remote units (RRUs) will be cascaded as one cell to serve mobile users on the high-speed railway, that is, a plurality of cells will be equivalent to one cell.

As can be seen from the above embodiment, the RRC information may further include the specified number of equivalent cells, so that the base station instructs the terminal to determine the cell type to be accessed as the cell served by the high-speed railway dedicated network according to the specified number of equivalent cells, which is convenient for the terminal to determine whether to access the cell served by the high-speed railway dedicated network according to the speed state of the terminal, thereby improving practicality of cell access.

In an embodiment, the specified threshold information of the RRC information in the above step 110 may include: a specified duration for evaluating the speed state, a first number range of cell reselection times corresponding to a high speed state and a second number range of cell reselection times corresponding to a low speed state.

In an embodiment of the present disclosure, each of the specified duration, the first number range of cell reselection times and the second number range of cell reselection times may be a value set in advance by the base station according to an actual condition. For example, a value range of the specified duration is 30 seconds to 480 seconds.

As can be seen from the above embodiment, the specified threshold information may include the specified duration for evaluating the speed state, and the first number range of cell reselection times corresponding to the high speed state and the second number range of cell reselection times corresponding to the low speed state, so that the base station can instruct the terminal to determine whether the speed state of the terminal is the high speed state or the low speed state according to the specified threshold information, which is convenient for the terminal to access different cells according to whether the speed state thereof is the high speed state or the low speed state, thereby avoiding network congestion caused by all terminals accessing the cell of same type, and thus improving communication quality.

In an embodiment, in addition to the specified duration for evaluating the speed state, and the first number range of cell reselection times corresponding to the high speed state and the second number range of cell reselection times corresponding to the low speed state, the specified threshold information of the RRC information in the step 110 above further includes a third number range of cell reselection times corresponding to a medium speedstate.

In another embodiment of the present disclosure, each of the specified duration, the first number range of cell reselection times, the second number range of cell reselection times and the third number range of cell reselection times may be a value set in advance by the base station according to an actual condition.

For example, the specified duration is 240 seconds, and that the number of the cell reselection times exceeds 16 within 240 seconds is the high speed state; that the number of the cell reselection times exceeds 8 and is equal to or less than 16 within 240 seconds is the medium speed state and that the number of the cell reselection times exceeds 1 and is equal to or less than 8 within 240 seconds is the low speed state.

As can be seen from the above embodiment, the specified threshold information may also include the third number range of cell reselection times corresponding to the medium speed state, so that the base station can instruct the terminal to determine whether the speed state of the terminal is the high speed state, the medium state or the low speed state according to the specified threshold information, which is convenient for the terminal to access an appropriate cell according to the speed state thereof, thereby improving an efficiency of cell access.

Figure 3:
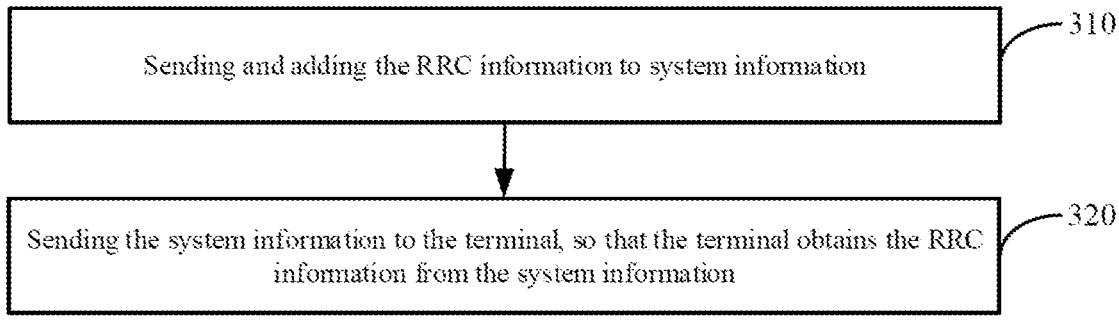
FIG. 3 is a flowchart showing another cell access method according to an exemplary embodiment.

FIG. 3 is a flowchart showing another cell access method according to an exemplary embodiment. The cell access method may be applied to a base station. On the basis of the method shown in FIG. 1, the step 120 of sending the RRC information to the terminal may include the following steps 310-320, as shown in FIG. 3.

In step 310, the RRC information is sent and added to system information. In an embodiment of the present disclosure, the base station may add the RRC information to the system information and broadcast the same.

In step 320, the system information is sent to the terminal, so that the terminal obtains the RRC information from the system information.

As can be seen from the above embodiment, by sending and adding the RRC information to the system information and sending the system information to the terminal so as to obtain, by the terminal, the RRC information from the system information, the terminal can quickly obtain the RRC information from the system information, thereby improving convenience of obtaining the RRC information.

In an embodiment, the system information in the above step 310 may be specifically a system information block SIB3.

In an embodiment of the present disclosure, the SIB3 is system information 3 in the LTE network. In addition to using the SIB3 to carry the RRC information, other information blocks or an information block newly designed can be used to carry the RRC information.

As can be seen from the above embodiment, by adding the RRC information to the SIB3 and sending the SIB3 to the terminal, the terminal can quickly obtain the RRC information from the SIB3, thereby improving transmission reliability of the RRC information.

Figure 4:
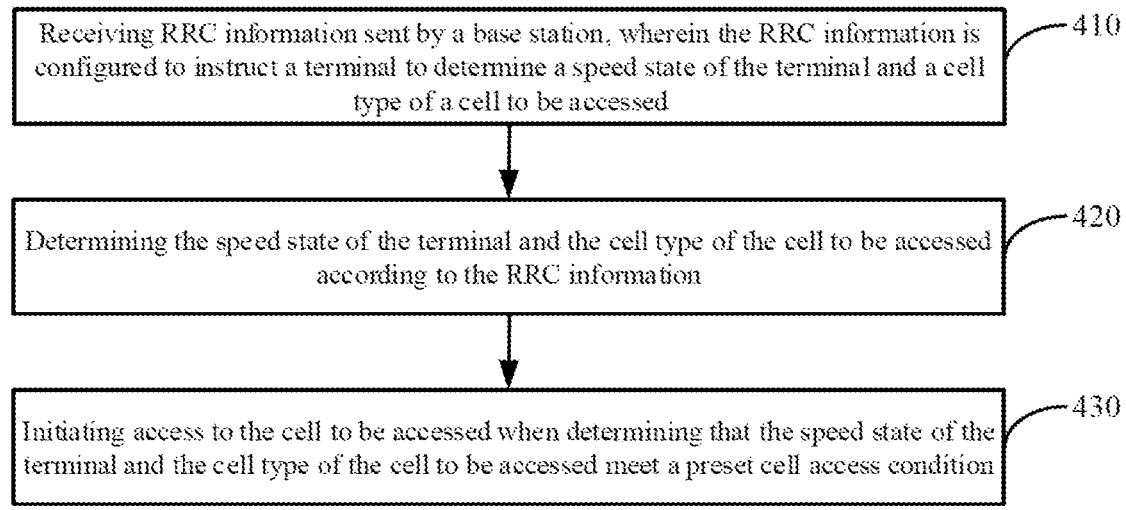
FIG. 4 is a flowchart showing a cell access method according to an exemplary embodiment.

FIG. 4 is a flowchart showing a cell access method according to an exemplary embodiment. The cell access method may be applied to a terminal. As shown in FIG. 4, the cell access method may include the following steps 410-430.

In step 410, RRC information sent by a base station is received. The RRC information is configured to instruct the terminal to determine a speed state of the terminal and a cell type of a cell to be accessed. In an embodiment of the present disclosure, the RRC information may be a piece of information defined by the base station to instruct the terminal to determine the speed state of the terminal and the cell type of the cell to be accessed.

In step 420, the speed state of the terminal and the cell type of the cell to be accessed are determined according to the RRC information.

In step 430, access is initiated to the cell to be accessed when it is determined that the speed state of the terminal and the cell type of the cell to be accessed meet a preset cell access condition. In an embodiment of the present disclosure, before accessing the cell, the terminal needs to determine the speed state thereof and the cell type of the cell to be accessed according to instructions of the base station, then determine whether the speed state thereof and the cell type of the cell to be accessed meet the preset cell access condition, and if so, initiates the access to the cell, and if not, can not initiate the access to the cell.

As can be seen from the above embodiment, the terminal receives the RRC information sent by the base station and configured to instruct the terminal to determine the speed state of the terminal and the cell type of the cell to be accessed, determines the speed state of the terminal and the cell type of the cell to be accessed according to the RRC information, and initiates access to the cell to be accessed when determining that the speed state of the terminal and the cell type of the cell to be accessed meet the preset cell access condition, therefore the terminal may access an appropriate cell under instruction of the base station, thereby improving accuracy of cell access.

Figure 5:
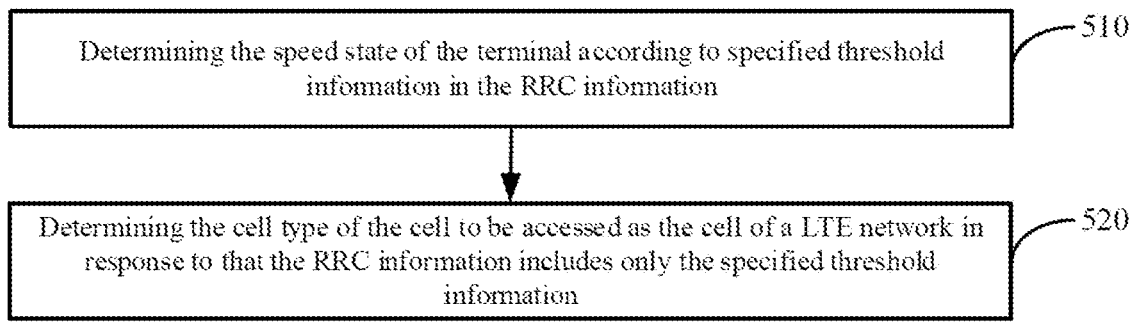
FIG. 5 is a flowchart showing another cell access method according to an exemplary embodiment.

FIG. 5 is a flowchart showing another cell access method according to an exemplary embodiment. The cell access method may be applied to the terminal, and is on the basis of the method shown in FIG. 4. The RRC information includes specified threshold information for instructing the terminal to determine the speed state. As shown in FIG. 5, the step 420 of determining the speed state of the terminal and the cell type of the cell to be accessed according to the RRC information may include the following steps 510-520.

In step 510, the speed state of the terminal is determined according to the specified threshold information in the RRC information. In an embodiment of the present disclosure, the specified threshold information may be set in advance by the base station according to an actual situation, and is used by the terminal to determine the speed state thereof. The speed state may include a high speed state, and/or a medium speed state, and/or a low speed state, and so on.

In step 520, it is determined that the cell type of the cell to be accessed is the cell of the LTE network in response to that the RRC information includes only the specified threshold information.

As can be seen from the above embodiment, by determining the speed state of the terminal according to the specified threshold information in the RRC information, and determining the cell type of the cell to be accessed as the cell of the LTE network in response to that the RRC information includes only the specified threshold information, the terminal can determine whether to access the cell of the LTE network according to the speed state thereof, thereby improving reliability of cell access.

Figure 6:
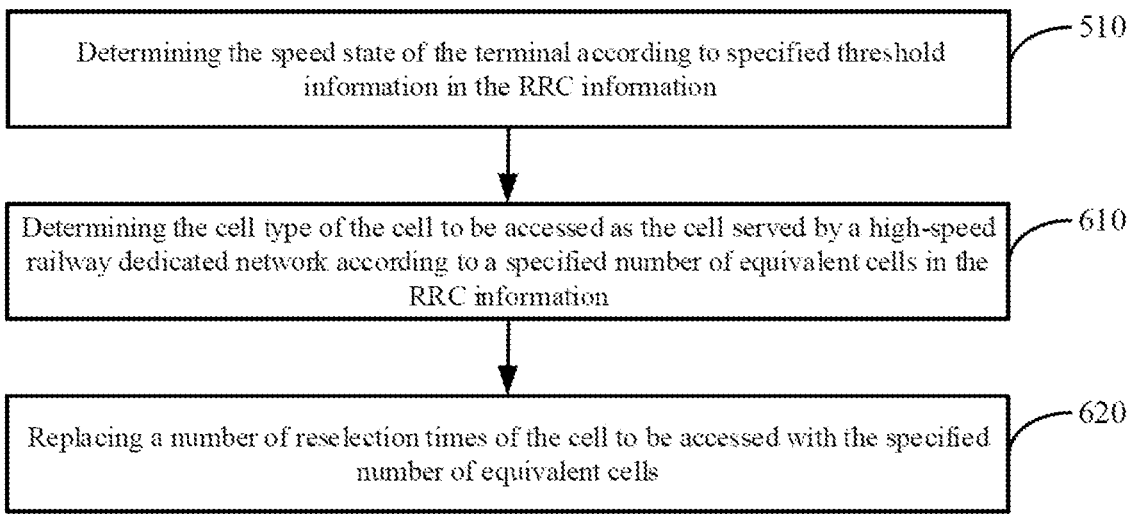
FIG. 6 is a flowchart showing another cell access method according to an exemplary embodiment.

FIG. 6 is a flowchart showing another cell access method according to an exemplary embodiment. The cell access method may be applied to a terminal and is on the basis of the method shown in FIG. 5. The RRC information further includes a specified number of equivalent cells, and the specified number of equivalent cells is a number of equivalent cells corresponding to the cell to be accessed and is used to instruct the terminal to determine that the cell type is the cell served by a high-speed railway dedicated network. The step 420 of determining the speed state of the terminal and the cell type of the cell to be accessed according to the RRC information may include the following steps 610-620, as shown in FIG. 6.

In step 610, it is determined the cell type of the cell to be accessed as the cell served by the high-speed railway dedicated network according to the specified number of equivalent cells in the RRC information. In an embodiment of the present disclosure, the specified number of equivalent cells may be a value set in advance by the base station according to an actual condition. For example, a value range of the specified number of equivalent cells is 1 to 10.

In step 620, a number of reselection times of the cell to be accessed is replaced with the specified number of equivalent cells. In an exemplary embodiment of the present disclosure, if five RRUs are cascaded into one cell, the specified number of equivalent cells is 5, that is, when it is reselected is from this cell to be accessed to another cell, the number of the reselection times of this cell is 5.

As can be seen from the above embodiment, by determining the cell type of the cell to be accessed as the cell served by the high-speed railway dedicated network according to the specified number of equivalent cells in the RRC information, and replacing the number of the reselection times of the cell to be accessed with the specified number of equivalent cells, the terminal can access the cell served by the high-speed railway dedicated network only when the speed state thereof meets the condition for accessing the cell served by the high-speed railway dedicated network, thereby avoiding the congestion of the high-speed railway dedicated network caused by that any terminal can access the high-speed railway dedicated network, and thus improving service quality of the high-speed railway dedicated network.

Figure 7:
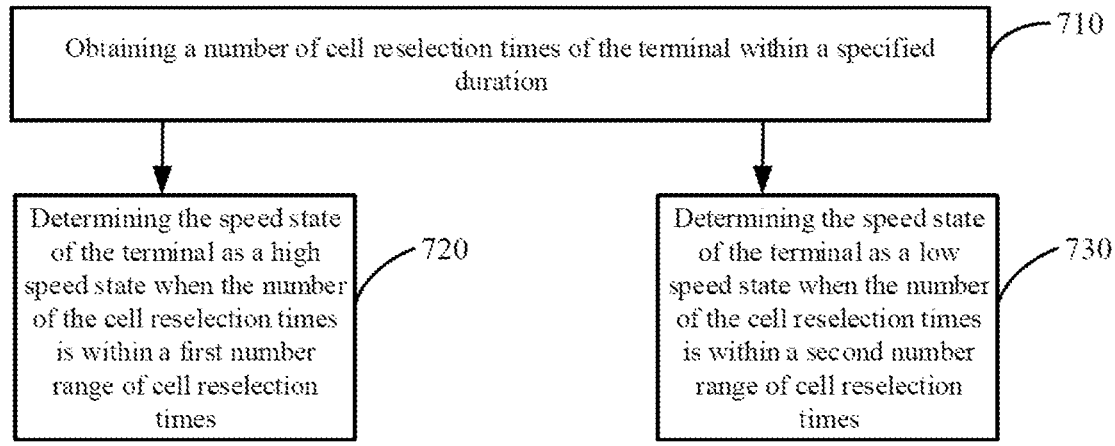
FIG. 7 is a flowchart showing another cell access method according to an exemplary embodiment.

FIG. 7 is a flowchart showing another cell access method according to an exemplary embodiment. The cell access method may be applied to the terminal, and is on the basis of the method shown in FIG. 5 or FIG. 6. The specified threshold information includes a specified duration for evaluating the speed state, a first number range of cell reselection times corresponding to a high speed state and a second number range of cell reselection times corresponding to a low speed state. The step 510 of determining the speed state of the terminal according to the specified threshold information in the RRC information may include the following steps 710-730, as shown in FIG. 7.

In step 710, a number of cell reselection times of the terminal within the specified duration is obtained. In an embodiment of the present disclosure, the specified duration may be a value set in advance by the base station according to an actual condition. For example, a value range of the specified duration is 30 seconds to 480 seconds.

In step 720, if the number of the cell reselection times is within the first number range of cell reselection times, it is determined that the speed state of the terminal is a high speed state.

In step 730, if the number of the cell reselection times is within the second number range of cell reselection times, it is determined that the speed state of the terminal is a low speed state.

As can be seen from the above embodiment, it can be determined that the speed state of the terminal is the high speed state or the low speed state according to the specified duration, the first number range of cell reselection times and the second number range of cell reselection times, so that the terminal can access different cells according to whether the speed state thereof is the high speed state or the low speed state, thereby avoiding network congestion caused by all terminals accessing the cell of same type, and thus improving communication quality.

Figure 8:
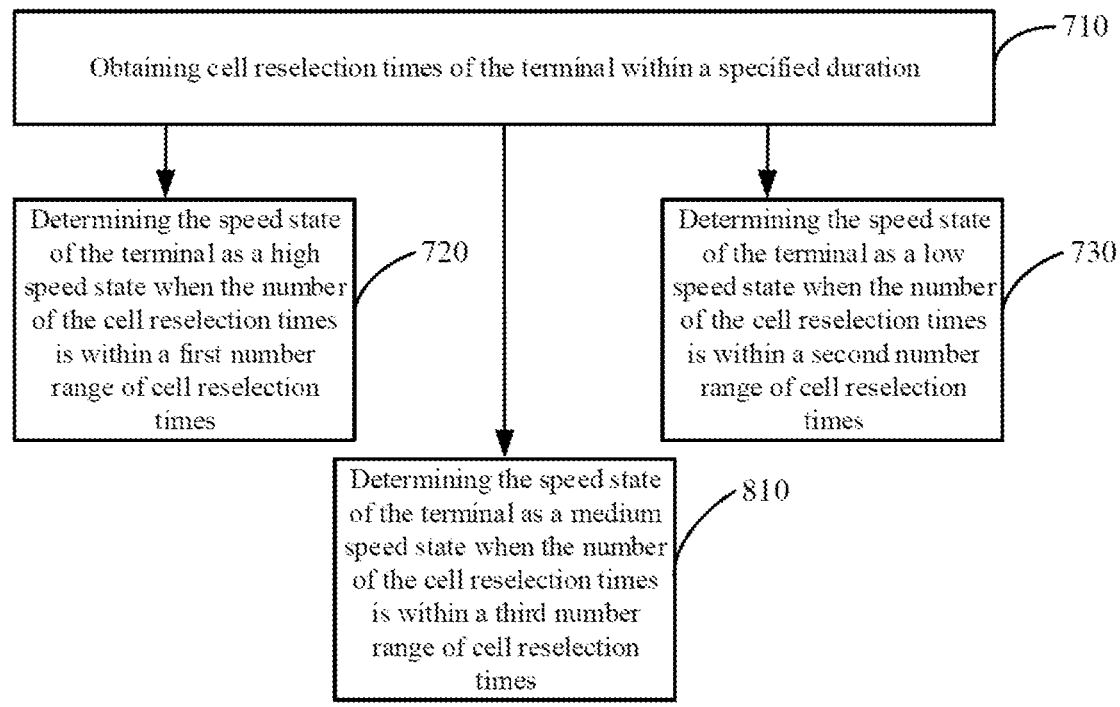
FIG. 8 is a flowchart showing another cell access method according to an exemplary embodiment.

FIG. 8 is a flowchart showing another cell access method according to an exemplary embodiment. The cell access method may be applied to the terminal and is on the basis of the method shown in FIG. 7. The specified threshold information further includes a third number range of cell reselection times corresponding to a medium speed state. The step 510 of determining the speed state of the terminal according to the specified threshold information in the RRC information may include the following step 810, as shown in FIG. 8.

In step 810, if the number of the cell reselection times is within the third number range of cell reselection times, it is determined that the speed state of the terminal is the medium speed state. For example, the specified duration is 240 seconds, and that the number of the cell reselection times exceeds 16 within 240 seconds is the high speed state, that the number of the cell reselection times exceeds 8 and is equal to or less than 16 within 240 seconds is the medium speed state, and that the number of the cell reseection times exceeds 1 and is equal to or less than 8 within 240 seconds is the low speed state.

As can be seen from the above embodiment, it can be determined that the speed state of the terminal is the high speed state, the medium speed state or the low speed state according to the specified duration, the first number range of cell reselection times, the second number range of cell reselection times and the third number range of cell reselection times, so that the terminal can access an appropriate cell according to the speed state thereof, thereby improving efficiency of cell access.

Figure 9:
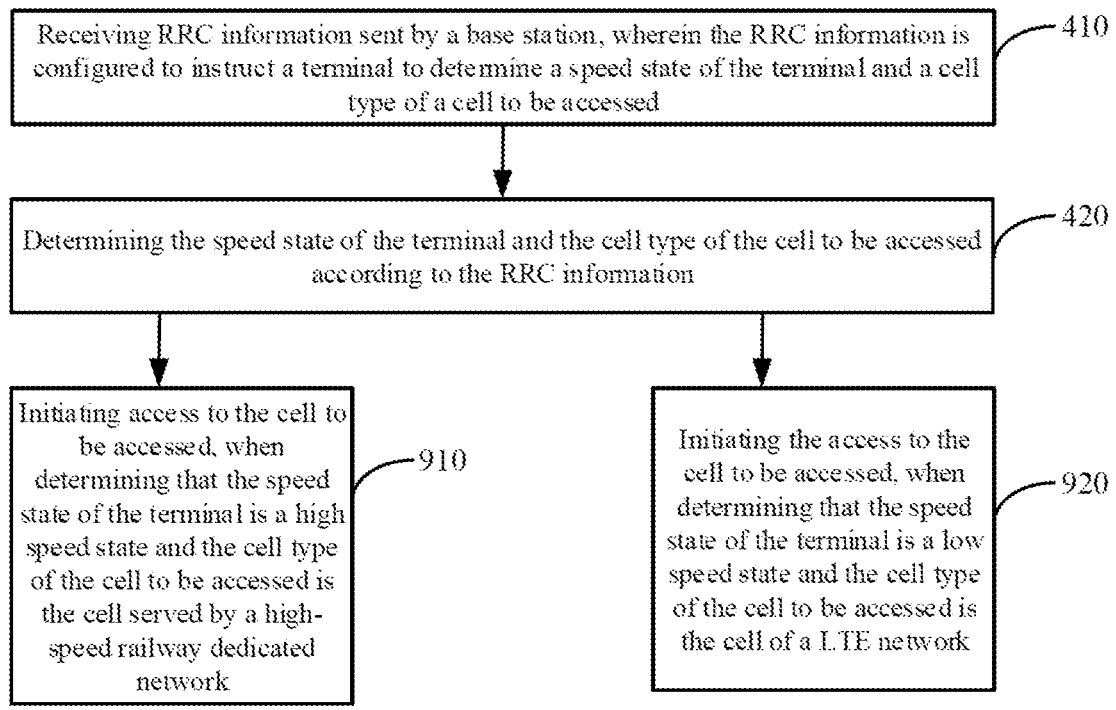
FIG. 9 is a flowchart showing another cell access method according to an exemplary embodiment.

FIG. 9 is a flowchart showing another cell access method according to an exemplary embodiment. The cell access method may be applied to the terminal and is on the basis of the method shown in FIG. 4. The preset cell access condition includes: the speed state being the high speed state, and the cell type being the cell served by the high-speed railway dedicated network; or the speed state being the low speed state, and the cell type being the cell of the LTE network. The step 430 of initiating access to the cell to be accessed when determining that the speed state of the terminal and the cell type of the cell to be accessed meet the preset cell access condition may include the following steps 910-920, as shown in FIG. 9.

In step 910, when it is determined that the speed state of the terminal is the high speed state, and the cell type of the cell to be accessed is the cell served by the high-speed railway dedicated network, access is initiated to the cell to be accessed.

In step 920, when it is determined that the speed state of the terminal is the low speed state and the cell type of the cell to be accessed is the cell of the LTE network, access is initiated to the cell to be accessed.

As can be seen from the above embodiment, by initiating the access to the cell to be accessed when determining that the speed state of the terminal is the high speed state and the cell type of the cell to be accessed is the cell served by the high-speed railway dedicated network, and initiating the access to the cell to be accessed when determining that the speed state of the terminal is the low speed state and the cell type of the cell to be accessed is the cell of the LTE network, the terminals with different speed states can access cells of different types, thereby avoiding network congestion caused by all terminals accessing the cell of same type, and thus improving reliability of cell access.

Figure 10:
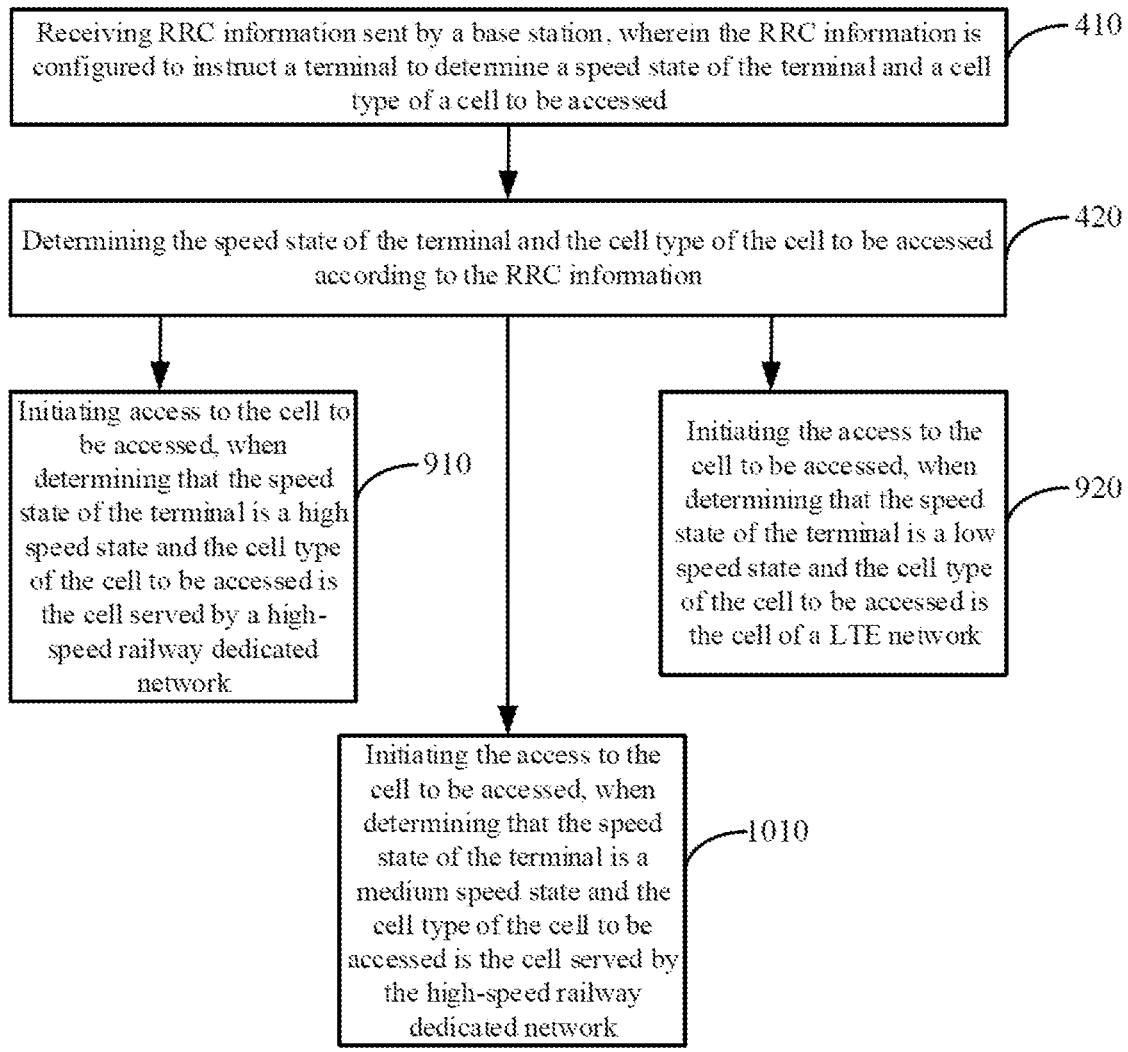
FIG. 10 is a flowchart showing another cell access method according to an exemplary embodiment.

FIG. 10 is a flowchart showing another cell access method according to an exemplary embodiment. The cell access method may be applied to the terminal, and is on the basis of the method shown in FIG. 9. The preset cell access condition further includes: the speed state being the medium speed state, and the cell type being the cell served by the high-speed railway dedicated network. The step 430 of initiating access to the cell to be accessed when determining that the speed state of the terminal and the cell type of the cell to be accessed meet the preset cell access condition may include the following step 1010, as shown in FIG. 10.

In step 1010, when it is determined that the speed state of the terminal is the medium speed state, and the cell type of the cell to be accessed is the cell served by the high-speed railway dedicated network, access is initiated to the cell to be accessed.

As can be seen from the above embodiment, by initiating the access to the cell to be accessed when determining that the speed state of the terminal is the medium speed state and the cell type of the cell to be accessed is the cell served by the high-speed railway dedicated network, it satisfies the demand that the terminal with the medium speed state access the cell served by the high-speed railway dedicated network, thereby improving stability of cell access.

Figure 11:
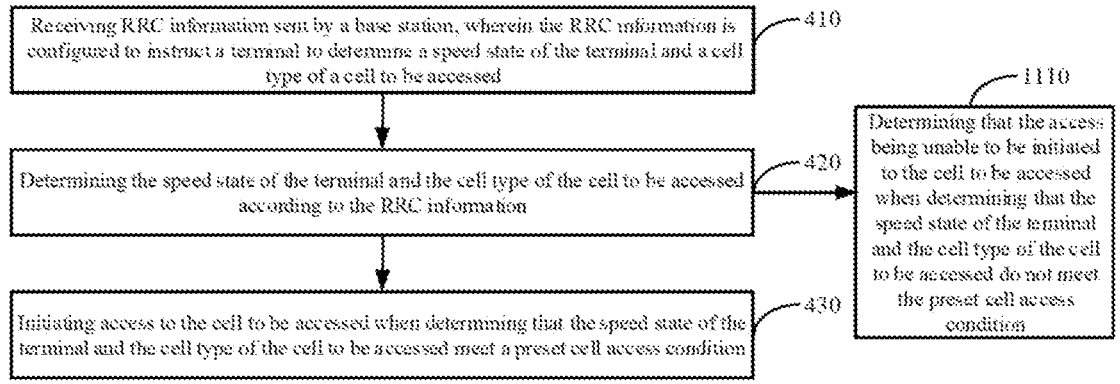
FIG. 11 is a flowchart showing another cell access method according to an exemplary embodiment.

FIG. 11 is a flowchart showing another cell access method according to an exemplary embodiment. The cell access method may be applied to the terminal and is on the basis of the method shown in FIG. 4 or 9 or 10. As shown in FIG. 11, the cell access method may further include the following step 1110.

In step 1110, when it is determined that the speed state of the terminal and the cell type of the cell to be accessed do not meet the preset cell access condition, it is determined that access cannot be initiated to the cell to be accessed.

As can be seen from the above embodiment, by determining not to initiate the access to the cell to be accessed when determining that the speed state of the terminal and the cell type of the cell to be accessed do not meet the preset cell access condition, network congestion caused by that any terminal can access the cell of same type is avoided and service quality of the cell to be accessed is improved.

Corresponding to the foregoing embodiments of the cell access method, the present disclosure also provides embodiments of a cell access device.

Figure 12:
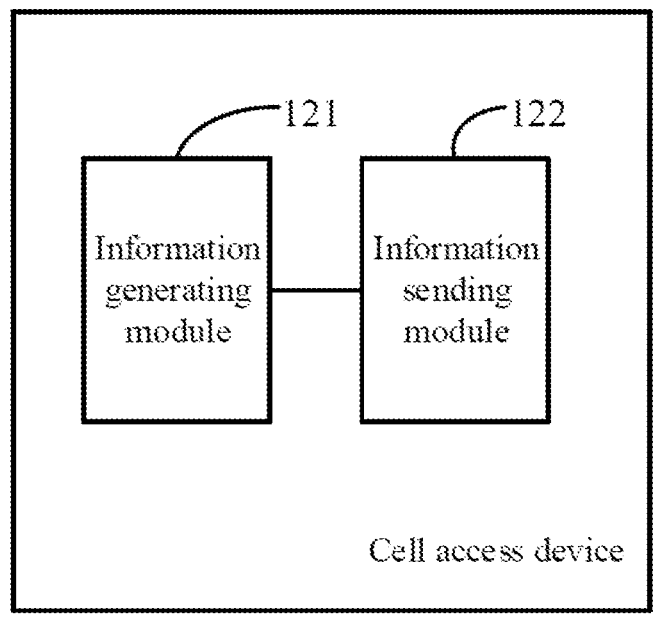
FIG. 12 is a block diagram showing a cell access device according to an exemplary embodiment.

FIG. 12 is a block diagram showing a cell access device according to an exemplary embodiment. The device may be applied to a base station and be configured to perform the cell access method shown in FIG. 1. As shown in FIG. 12, the device includes an information generating module 121 that is configured to generate radio resource control (RRC) information, wherein the RRC information is configured to instruct a terminal to determine a speed state of the terminal and a cell type of a cell to be accessed, and an information sending module 122 that is configured to send the RRC information to the terminal, so that the terminal determines the speed state and the cell type according to the RRC information, and initiates access to the cell to be accessed when determining that the speed state and the cell type meet a preset cell access condition.

As can be seen from the above embodiment, by generating the RRC information configured to instruct the terminal to determine the speed state of the terminal and the cell type of the cell to be accessed and sending the RRC information to the terminal, the base station can instruct the terminal to determine the speed state of the terminal and the cell type of the cell to be accessed according to the RRC information, so that the terminal may access an appropriate cell under instruction of the base station, thereby improving accuracy of cell access. In an embodiment, the RRC information can include specified threshold information for instructing the terminal to determine the speed state.

As can be seen from the above embodiment, the RRC information may include the specified threshold information for instructing the terminal to determine the speed state, so that the base station instructs the terminal to determine the speed state of the terminal through the specified threshold information, which is convenient for the terminal to access an appropriate cell according to the speed state thereof, thereby improving reliability of cell access.

In an embodiment, the RRC information further includes a specified number of equivalent cells. The specified number of equivalent cells is a number of equivalent cells corresponding to the cell to be accessed. The specified number of equivalent cells is used to instruct the terminal to determine that the cell type is the cell served by a high-speed railway dedicated network.

As can be seen from the above embodiment, the RRC information may further include the specified number of equivalent cells, so that the base station instructs the terminal to determine the cell type to be accessed as the cell served by the high-speed railway dedicated network according to the specified number of equivalent cells, which is convenient for the terminal to determine whether to access the cell served by the high-speed railway dedicated network according to the speed state of the terminal, thereby improving practicality of cell access.

In an embodiment, the specified threshold information includes a specified duration for evaluating the speed state, and a first number range of cell reselection times corresponding to a high speed state and a second number range of cell reselection times corresponding to a low speed state.

As can be seen from the above embodiment, the specified threshold information may include the specified duration for evaluating the speed state, and the first number range of cell reselection times corresponding to the high speed state and the second number range of cell reselection times corresponding to the low speed state, so that the base station can instruct the terminal to determine whether the speed state of the terminal is the high speed state or the low speed state according to the specified threshold information, which is convenient for the terminal to access different cells according to whether the speed state thereof is the high speed state or the low speed state, thereby avoiding network congestion caused by all terminals accessing the cell of same type, and thus improving communication quality. In an embodiment, the specified threshold information can further include a third number range of cell reselection limes corresponding to a medium speed state.

As can be seen from the above embodiment, the specified threshold information may also include the third number range of cell reselection times corresponding to the medium speed state, so that the base station can instruct the terminal to determine whether the speed state of the terminal is the high speed state, the medium state or the low speed state according to the specified threshold information, which is convenient for the terminal to access an appropriate cell according to the speed state thereof, thereby improving an efficiency of cell access.

Figure 13:
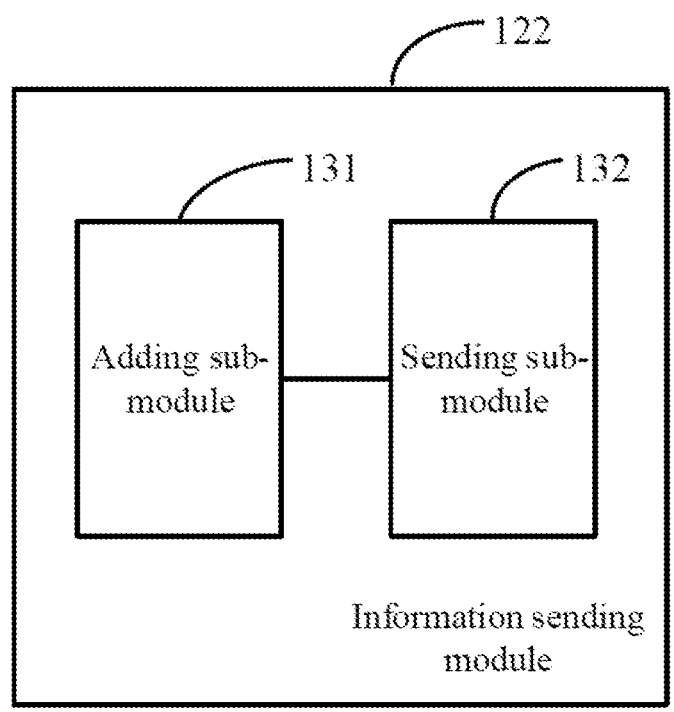
FIG. 13 is a block diagram showing another cell access device according to an exemplary embodiment.

In an embodiment, on the basis of the device shown in FIG. 12, as shown in FIG. 13, the information sending module 122 may include an adding sub-module 131 that is configured to send and add the RRC information to system information, and a sending sub-module 132 that is configured to send the system information to the terminal, so that the terminal obtains the RRC information from the system information.

As can be seen from the above embodiment, by sending and adding the RRC information to the system information and sending the system information to the terminal so as to obtain, by the terminal, the RRC information from the system information, the terminal can quickly obtain the RRC information from the system information, thereby improving convenience of obtaining the RRC information. In an embodiment, the system information is specifically a system information block SIB3.

As can be seen from the above embodiment, by adding the RRC information to the SIB3 and sending the SIB3 to the terminal, the terminal can quickly obtain the RRC information from the SIB3, thereby improving transmission reliability of the RRC information.

Figure 14:
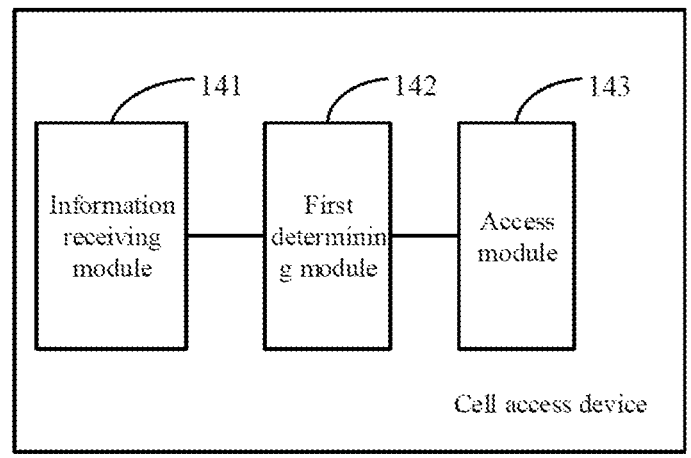
FIG. 14 is a block diagram showing a cell access device according to an exemplary embodiment.

FIG. 14 is a block diagram showing a cell access device according to an exemplary embodiment. The device may be applied to a terminal and be configured to perform the cell access method shown in FIG. 4. As shown in FIG. 14, the cell access device may include an information receiving module 141 that is configured to receive RRC information sent by a base station, wherein the RRC information is configured to instruct a terminal to determine a speed state of the terminal and a cell type of a cell to be accessed, a first determining module 142 that is configured to determine the speed state and the cell type according to the RRC information, and an access module 143 that is configured to initiate access to the cell to be accessed when it is determined that the speed state and the cell type meet a preset cell access condition.

As can be seen from the above embodiment, the terminal receives the RRC information sent by the base station and configured to instruct the terminal to determine the speed state of the terminal and the cell type of the cell to be accessed, determines the speed state of the terminal and the cell type of the cell to be accessed according to the RRC information, and initiates access to the cell to be accessed when determining that the speed state of the terminal and the cell type of the cell to be accessed meet the preset cell access condition, therefore the terminal may access an appropriate cell under instruction of the base station, thereby improving accuracy of cell access.

Figure 15:
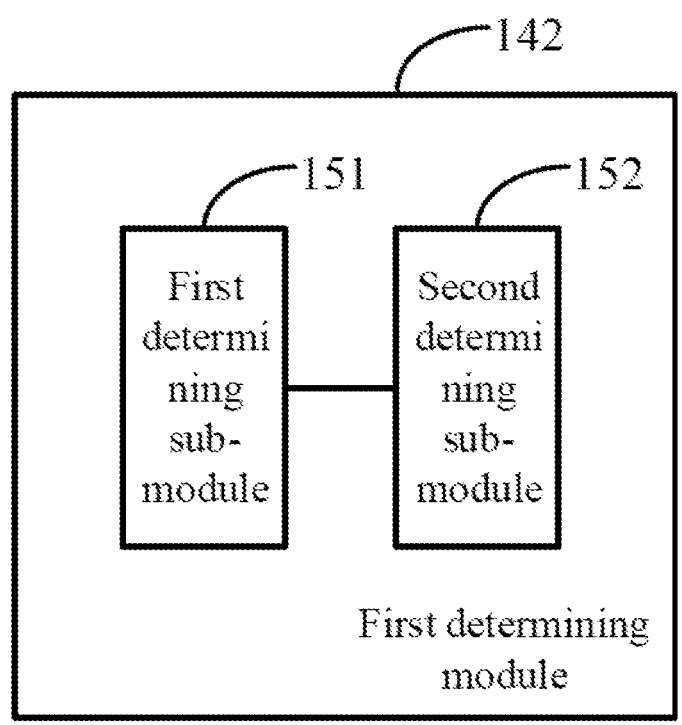
FIG. 15 is a block diagram showing another cell access device according to an exemplary embodiment.

In an embodiment, on the basis of the device shown in FIG. 14, the RRC information includes specified threshold information for instructing the terminal to determine the speed state. As shown in FIG. 15, the first determining module 142 may include a first determining sub-module 151 that is configured to determine the speed state according to the specified threshold information, and a second determining sub-module 152, configured to determine the cell type as the cell of a long-term evolution LTE network in response to that the RRC information includes only the specified threshold information.

As can be seen from the above embodiment, by determining the speed state of the terminal according to the specified threshold information in the RRC information, and determining the cell type of the cell to be accessed as the cell of the LTE network in response to that the RRC information includes only the specified threshold information, the terminal can determine whether to access the cell of the LTE network according to the speed state thereof, thereby improving reliability of cell access.

Figure 16:
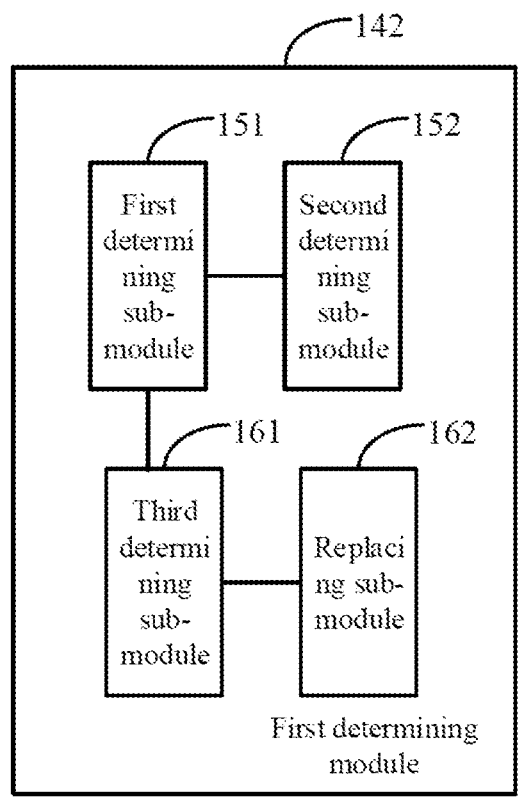
FIG. 16 is a block diagram showing another cell access device according to an exemplary embodiment.

In an embodiment, on the basis of the device shown in FIG. 15, the RRC information further includes a specified number of equivalent cells, the specified number of equivalent cells is a number of equivalent cells corresponding to the cell to be accessed, and the specified number of equivalent cells is used to instruct the terminal to determine that the cell type is the cell served by a high-speed railway dedicated network. As shown in FIG. 16, the first determining module 142 may further include a third determining sub-module 161 that is configured to determine the cell type as the cell served by the high-speed railway dedicated network according to the specified number of equivalent cells, and a replacing sub-module 162 that is configured to replace a number of reselection times of the cell to be accessed with the specified number of equivalent cells.

As can be seen from the above embodiment, by determining the cell type of the cell to be accessed as the cell served by the high-speed railway dedicated network according to the specified number of equivalent cells in the RRC information, and replacing the number of the reselection times of the cell to be accessed with the specified number of equivalent cells, the terminal can access the cell served by the high-speed railway dedicated network only when the speed state thereof meets the condition for accessing the cell served by the high-speed railway dedicated network, thereby avoiding the congestion of the high-speed railway dedicated network caused by that any terminal can access the high-speed railway dedicated network, and thus improving service quality of the high-speed railway dedicated network.

Figure 17:
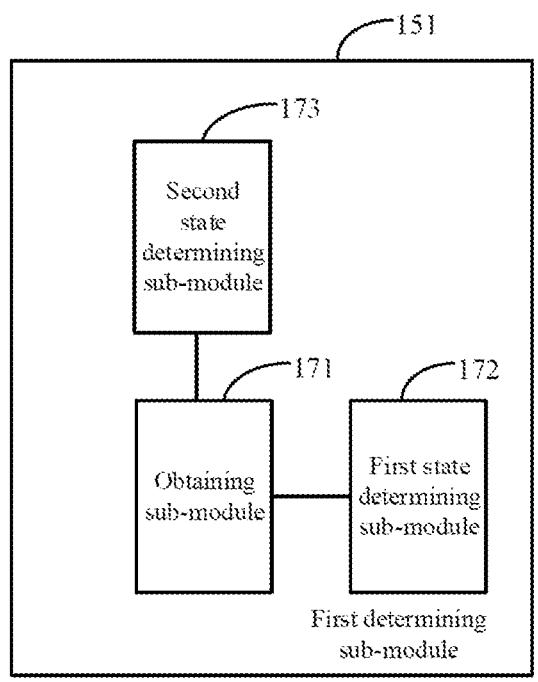
FIG. 17 is a block diagram showing another cell access device according to an exemplary embodiment.

In an embodiment, on the basis of the device shown in FIG. 15 or FIG. 16, the specified threshold information includes a specified duration for evaluating the speed state, and a first number range of cell reselection times corresponding to a high speed state and a second number range of cell reselection times corresponding to a low speed state. As shown in FIG. 17, the first determining sub-module 151 may include an obtaining sub-module 171 that is configured to obtain a number of cell reselection times of the terminal within the specified duration, a first state determining sub-module 172 that is configured to determine the speed state as the high speed state when the number of the cell reselection times is within the first number range of cell reselection times, and a second state determining sub-module 173 that is configured to determine the speed state as the low speed state when the number of the cell reselection times is within the second number range of cell reselection times.

As can be seen from the above embodiment, it can be determined that the speed state of the terminal is the high speed state or the low speed state according to the specified duration, the first number range of cell reselection times and the second number range of cell reselection times, so that the terminal can access different cells according to whether the speed state thereof is the high speed state or the low speed state, thereby avoiding network congestion caused by all terminals accessing the cell of same type, and thus improving communication quality.

Figure 18:
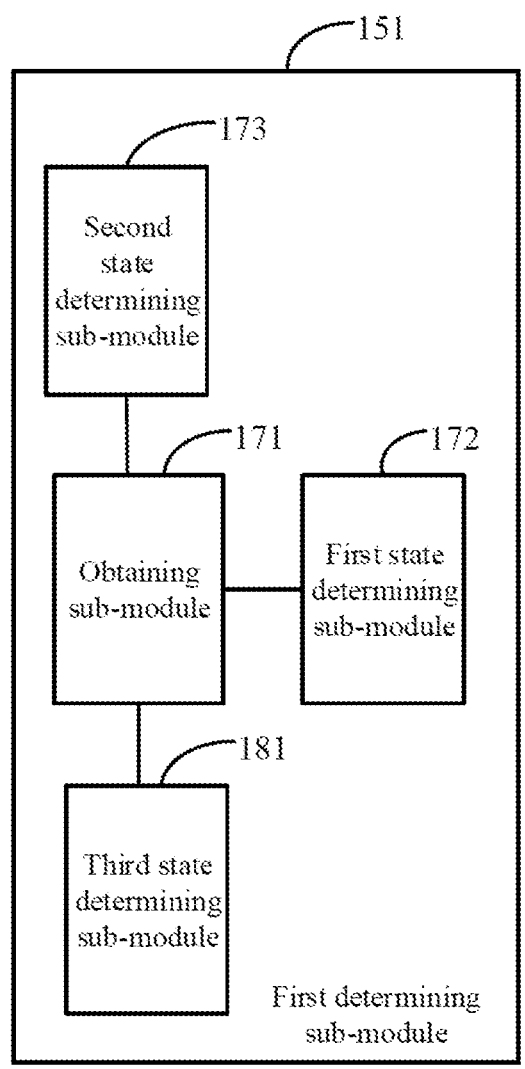
FIG. 18 is a block diagram showing another cell access device according to an exemplary embodiment.

In an embodiment, on the basis of the device shown in FIG. 17, the specified threshold information further includes a third number range of cell reselection times corresponding to a medium speed state. As shown in FIG. 18, the first determining sub-module 151 may also include a third state determining sub-module 18 that is configured to determine the speed state as the medium speed state when the number of the cell reselection times is within the third number range of cell reseection times.

As can be seen from the above embodiment, it can be determined that the speed state of the terminal is the high speed state, the medium speed state or the low speed state according to the specified duration, the first number range of cell reselection times, the second number range of cell reselection times and the third number range of cell reselection times, so that the terminal can access an appropriate cell according to the speed state thereof, thereby improving efficiency of cell access.

Figure 19:
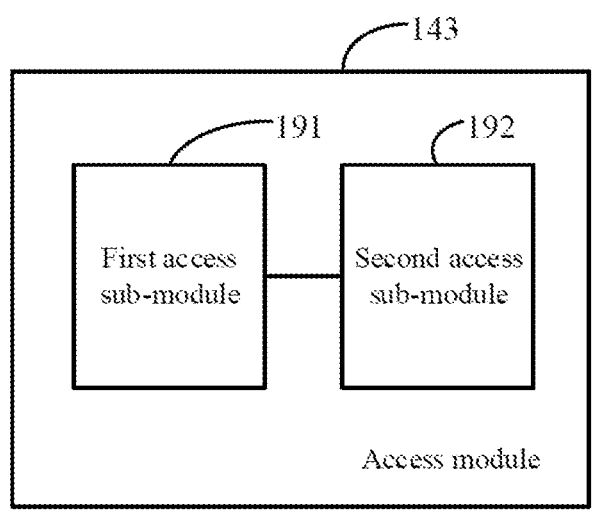
FIG. 19 is a block diagram showing another cell access device according to an exemplary embodiment.

In an embodiment, on the basis of the device shown in FIG. 14, the preset cell access condition includes the speed state being the high speed state, and the cell type being the cell served by the high-speed railway dedicated network or the speed state being the low speed state, and the cell type being the cell of the LTE network. As shown in FIG. 19, the access module 143 may include a first access sub-module 191 that is configured to initiate the access to the cell to be accessed, when it is determined that the speed state is the high speed state and the cell type is the cell served by the high-speed railway dedicated network, and a second access sub-module 192 that is configured to initiate the access to the cell to be accessed, when it is determined that the speed state is the low speed state and the cell type is the cell of the LTE network.

As can be seen from the above embodiment, by initiating the access to the cell to be accessed when determining that the speed state of the terminal is the high speed state and the cell type of the cell to be accessed is the cell served by the high-speed railway dedicated network, and initiating the access to the cell to be accessed when determining that the speed state of the terminal is the low speed state and the cell type of the cell to be accessed is the cell of the LTE network, the terminals with different speed states can access cells of different types, thereby avoiding network congestion caused by all terminals accessing the cell of same type, and thus improving reliability of cell access.

Figure 20:
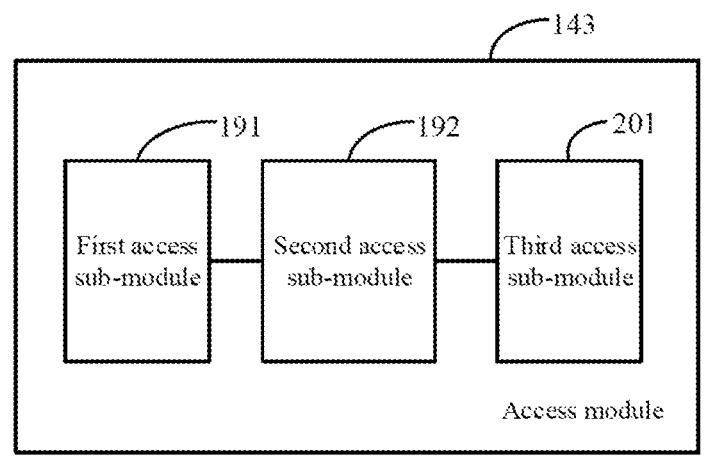
FIG. 20 is a block diagram showing another cell access device according to an exemplary embodiment.

In an embodiment, on the basis of the device shown in FIG. 19, the preset cell access condition can further include the speed state being the medium speed state, and the cell type being the cell served by the high-speed railway dedicated network. As shown in FIG. 20, the access module 143 may further include a third access sub-module 201 that is configured to initiate the access to the cell to be accessed, when it is determined that the speed state is the medium speed state and the cell type is the cell served by the high-speed railway dedicated network.

Figure 21:
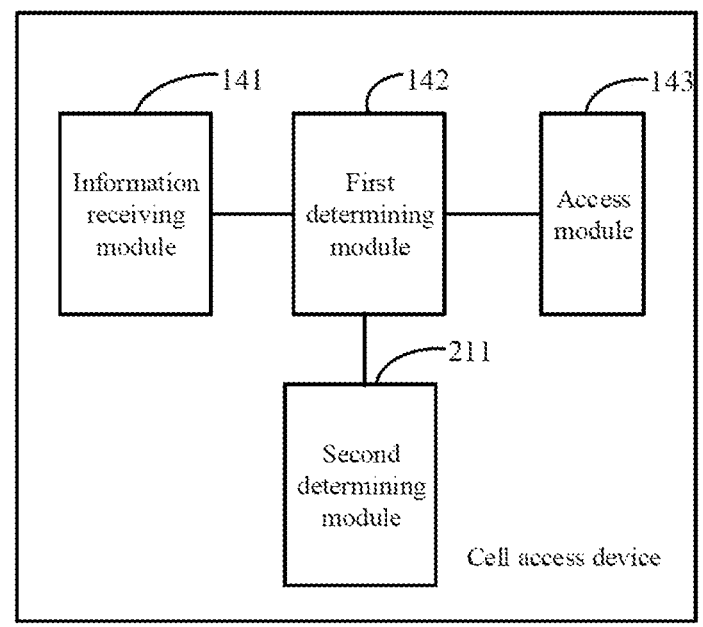
FIG. 21 is a block diagram showing another cell access device according to an exemplary embodiment.

In an embodiment, on the basis of the device shown in FIG. 14 or FIG. 19 or FIG. 20, as shown in FIG. 21, the cell access device may further include a second determining module 211 that is configured to determine not to initiate the access to the cell to be accessed when it is determined that the speed state and the cell type do not meet the preset cell access condition.

As can be seen from the above embodiment, by initiating the access to the cell to be accessed when determining that the speed state of the terminal is the medium speed state and the cell type of the cell to be accessed is the cell served by the high-speed railway dedicated network, it satisfies the demand that the terminal with the medium speed state accesses the cell served by the high-speed railway dedicated network, thereby improving stability of cell access.

As for the device embodiment, since it basically corresponds to the method embodiment, the relevant parts may refer to the description of the method embodiment. The device embodiments described above are only exemplary, in which the units described as separate components may or may not be physically separated, and the components shown as units may or may not be physical units, that is, may be located in one place, or can be distributed across multiple network units. Some or all of the modules can be selected according to actual needs to achieve the solution of the present disclosure. Those of ordinary skill in the art can understand and implement the present disclosure without creative efforts.

The present disclosure also provides a non-transitory computer-readable storage medium having a computer program stored thereon, and the computer program is configured to perform the cell access method described in any of FIGS. 1 to 3.

The present disclosure also provides a non-transitory computer-readable storage medium having a computer program stored thereon, and the computer program is configured to perform the cell access method described in any of FIGS. 4 to 11.

The present disclosure also provides a cell access device, which is applied to a base station. The cell access device can include a processor and a memory for storing executable instructions of the processor. The processor can be configured to generate RRC information, wherein the RRC information is configured to instruct a terminal to determine a speed state of the terminal and a cell type of a cell to be accessed, and send the RRC information to the terminal, so that the terminal determines the speed state and the cell type according to the RRC information, and initiates access to the cell to be accessed when determining that the speed state and the cell type meet a preset cell access condition.

Figure 22:
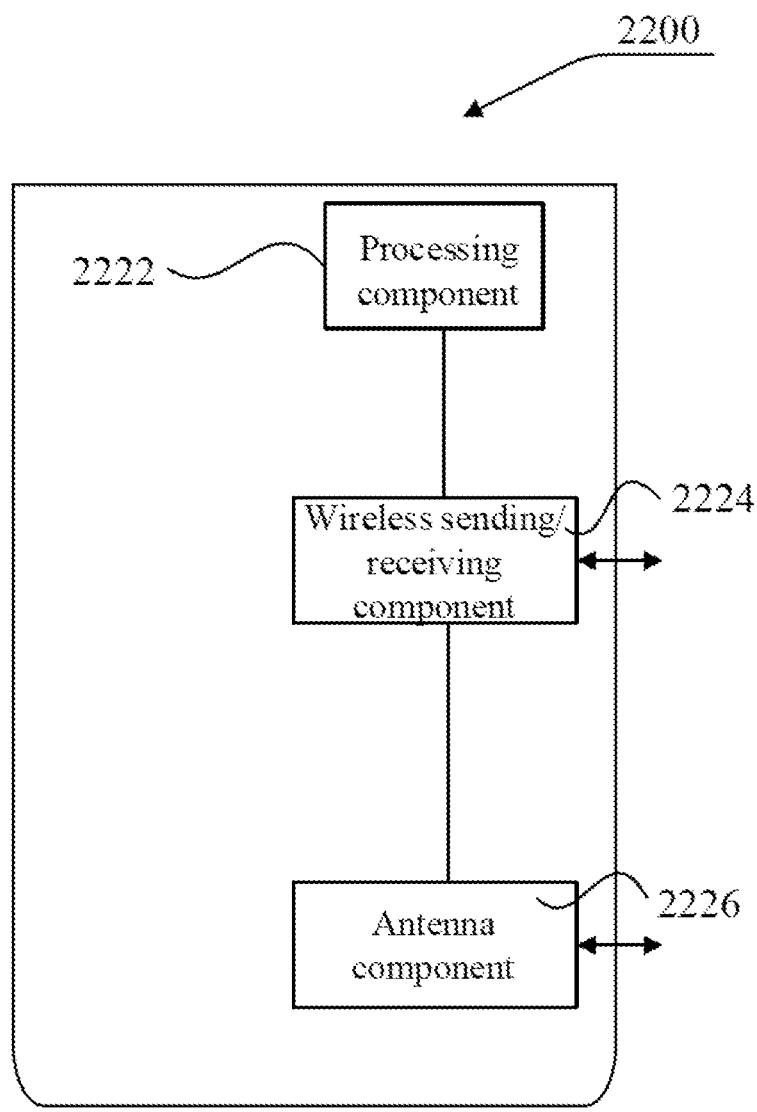
FIG. 22 is a schematic structural diagram showing a cell access device according to an exemplary embodiment.

FIG. 22 is a schematic structural diagram showing a cell access device according to an exemplary embodiment. As shown in FIG. 22, the device 2200 may be provided as a base station for a high-speed railway dedicated network. Referring to FIG. 22, the device 2200 includes a processing component 2222, a wireless sending/receiving component 2224, an antenna component 2226, and a signal processing part specific to a wireless interface. The processing component 2222 may further include one or more processors. Further, one of the processors in the processing component 2222 can be configured to perform the cell access method described in any of the above embodiments.

The present disclosure also provides a cell access device that is applied to a terminal that can include a processor and a memory for storing executable instructions of the processor. The processor can be configured to receive RRC information sent by a base station, wherein the RRC information is configured to instruct a terminal to determine a speed state of the terminal and a cell type of a cell to be accessed, determine the speed state and the cell type according to the RRC information, and initiate access to the cell to be accessed when determining that the speed state and the cell type meet a preset cell access condition.

Figure 23:
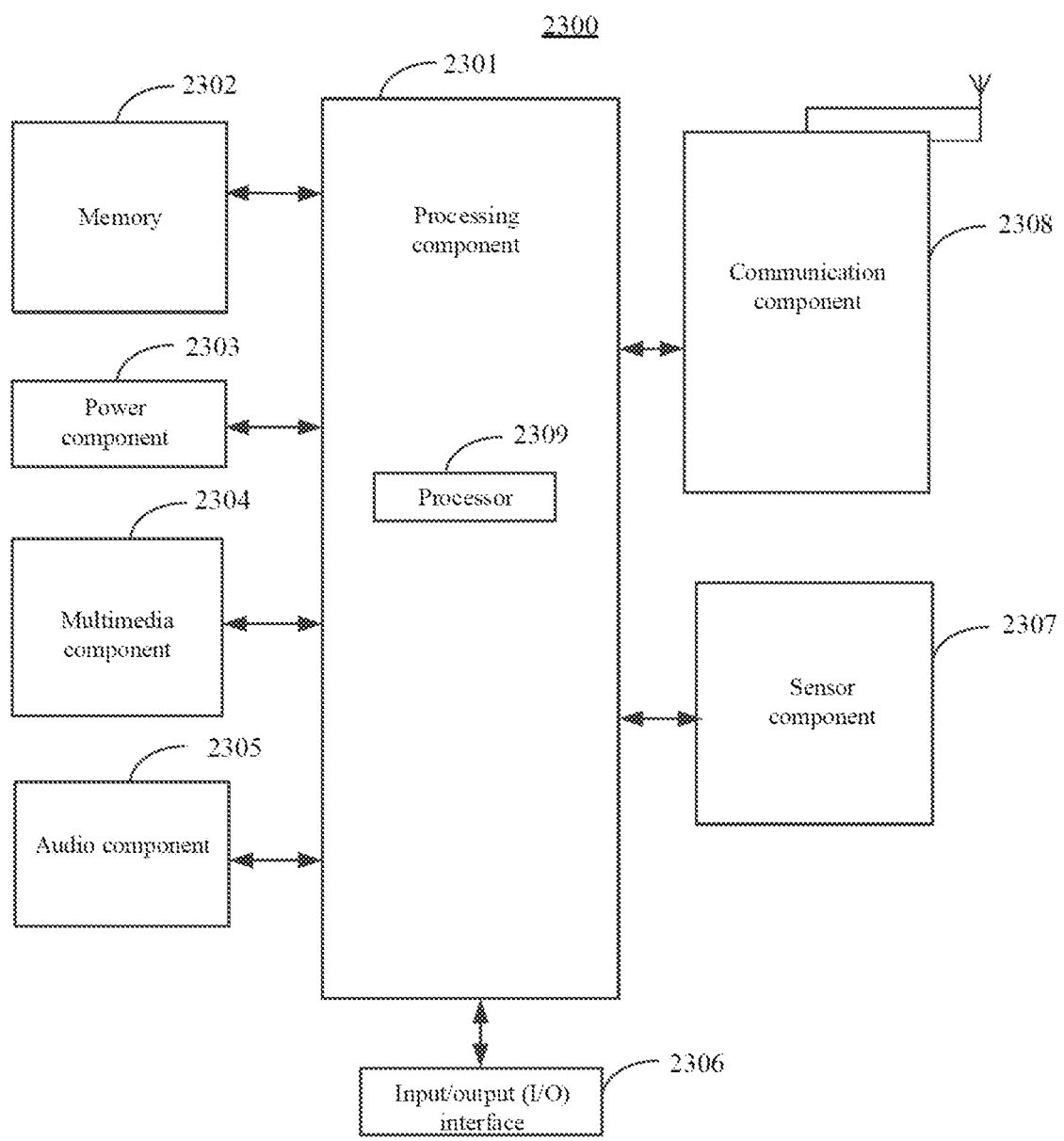
FIG. 23 is a schematic structural diagram showing a cell access device according to an exemplary embodiment.

FIG. 23 is a schematic structural diagram showing a cell access device according to an exemplary embodiment. As shown in FIG. 23, a cell access device 2300 is shown according to an exemplary embodiment. The device 2300 may be a terminal such as a computer, a mobile phone, a digital broadcasting terminal, a messaging device, a game console, a tablet device, a medical device, a fitness device, and a personal digital assistant.

Referring to FIG. 23, the device 2300 may include one or more of the following components: a processing component 2301, a memory 2302, a power component 2303, a multimedia component 2304, an audio component 2305, an input/output (I/O) interface 2306, a sensor component 2307, and a communication component 2308.

The processing component 2301 typically controls overall operations of the device 2300, such as the operations associated with display, telephone calls, data communications, camera operations, and recording operations. The processing component 2301 can include one or more processors 2309 to execute instructions to perform all or part of the steps in the above described methods. Moreover, the processing component 2301 can include one or more modules to facilitate interaction between the processing component 2301 and other components. For example, the processing component 2301 can include a multimedia module to facilitate the interaction between the multimedia component 2304 and the processing component 2301.

The memory 2302 is configured to store various types of data to support the operation of the device 2300. Examples of such data include instructions for any application or method operated on the device 23M, contact data, phone book data, messages, pictures, videos, and the like. The memory 2302 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2303 provides power to various components of the device 2300. The power component 2303 can include a power management system, one or more power supplies, and other components associated with generation, management, and distribution of power in the device 2300.

The multimedia component 2304 includes a screen providing an output interface between the device 2300 and a user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a time duration and a pressure associated with the touch or swipe action. In some embodiments, the multimedia component 2304 includes a front camera and/or a rear camera. When the device 2300 is in an operation mode, such as a photographing mode or a video mode, the front camera and/or the rear camera can receive external multimedia datum. Each of the front camera and the rear camera may be a fixed optical lens system or have focus and optical zoom capability.

The audio component 2305 is configured to output and/or input an audio signal. For example, the audio component 2305 includes a microphone (MIC) configured to receive an external audio signal when the device 2300 is in an operation mode, such as a call mode, a recording mode, and a voice recognition mode. The received audio signal may be further stored in the memory 2302 or sent via the communication component 2308. In some embodiments, the audio component 2305 also includes a speaker for outputting the audio signal.

The I/O interface 2306 provides an interface between the processing component 2301 and peripheral interface modules, such as a keyboard, a click wheel, buttons, and the like. These buttons may include, but are not limited to, a home button, a volume button, a starting button, and a locking button.

The sensor component 2307 includes one or more sensors for providing state assessments of various aspects of the device 2300. For example, the sensor component 2307 can detect an on/off state of the device 2300, relative positioning of components such as the display and the keypad of the device 2300. The sensor component 2307 can also detect a change in position of one component of the device 2300 or the device 2300, the presence or absence of user contact with the device 2300, an orientation or an acceleration/deceleration of the device 2300, and a change in temperature of the device 2300. The sensor component 2307 can include a proximity sensor configured to detect the presence of nearby objects without any physical contact. The sensor component 2307 can also include a light sensor, such as a CMOS or CCD image sensor, configured to be used in imaging applications. In some embodiments, the sensor component 2307 can also include an accelerometer sensor, a gyroscope sensor, a magnetic sensor, a pressure sensor, or a temperature sensor.

The communication component 2308 is configured to facilitate wired or wireless communication between the device 2300 and other devices. The device 2300 can access a wireless network based on a communication standard, such as WiFi, 4G or 5G, or a combination thereof. In an exemplary embodiment, the communication component 2308 receives broadcast signals or broadcast associated information from an external broadcast management system via a broadcast channel. In an exemplary embodiment, the communication component 2308 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 2300 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, so as to perform the above method.

In an exemplary embodiment, there is also provided a non-transitory computer-readable storage medium including instructions, such as a memory 2302 including instructions executable by the processor 2309 of the device 2300 to perform the above described method. For example, the non-transitory computer readable storage medium may be a ROM, a random access memory (RAM), a CD-ROM, a magnetic tape, a floppy disc, and an optical data storage device.

When the instructions in the storage medium are executed by the processor, the device 2300 is enabled to execute any of the cell access methods described above.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principle of the present disclosure and include common knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A cell access method that is applied to a base station, comprising:

generating radio resource control (RRC) information that is configured to instruct a terminal to determine a speed state of the terminal and a cell type of a cell to be accessed, wherein the RRC information comprises only specified threshold information for instructing the terminal to determine the speed state or both of the specified threshold information and a specified number of equivalent cells; and sending the RRC information to the terminal so that the terminal determines the speed state and the cell type according to the RRC information, determines whether the speed state and the cell type meet a preset cell access condition or not and initiates access to the cell to be accessed in response to determining that the speed state and the cell type meet the preset cell access condition, wherein:

the preset cell access condition comprises: the speed state being a high speed state and the cell type being the cell served by a high-speed railway dedicated network, or the speed state being a low speed state and the cell type being the cell of a LTE network, that the terminal initiates access to the cell to be accessed in response to determining that the speed state and the cell type meet preset the cell access condition comprises:

initiating, by the terminal, the access to the cell to be accessed in response to determining that the speed state is the high speed state and the cell type is the cell served by the high-speed railway dedicated network; and initiating, by the terminal, the access to the cell to be accessed in response to determining that the speed state is the low speed state and the cell type is the cell of the LTE network, and that the terminal determines the speed state and the cell type according to the RRC information comprises:

determining the speed state according to the specified threshold information;

determining, in response to that the RRC information comprises only the specified threshold information, the cell type being the cell of the LTE network; and determining, in response to that the RRC information comprises both of the specified threshold information and the specified number of equivalent cells, the cell type being the cell served by the high-speed railway dedicated network according to the specified number of equivalent cells.

2. The cell access method according to claim 1, wherein: the specified number of equivalent cells is a number of equivalent cells corresponding to the cell to be accessed and is configured to instruct the terminal to determine that the cell type is the cell served by the high-speed railway dedicated network.

3. The cell access method according to claim 1, wherein the specified threshold information comprises a specified duration for evaluating the speed stale, a first number range of cell reselection times corresponding to the high speed state, and a second number range of cell reselection times corresponding to the low speed state.

4. The cell access method according to claim 3, wherein the specified threshold information further comprises a third number range of cell reselection times corresponding to a medium speed state.

5. The cell access method according to claim 1, wherein the step of sending the RRC information to the terminal further comprises:

sending and adding the RRC information to system information; and sending the system information to the terminal so that the terminal obtains the RRC information from the system information.

6. The cell access method according to claim 5, wherein the system information is specifically a system information block SIB3.

7. A non-transitory computer-readable storage medium having a computer program stored thereon, wherein the computer program, when being executed by a processor, causes the processor to perform the cell access method according to claim 1.

8. A base station, comprising:
a processor; and
a memory for storing executable instructions of the processor that, when being executed by the processor, cause the processor to implement the cell assess method according to claim 1.

9. A cell access method that is applied to a terminal, comprising:

receiving RRC information sent by a base station, the RRC information being configured to instruct the terminal to determine a speed state of the terminal and a cell type of a cell to be accessed, wherein the RRC information comprises only specified threshold information for instructing the terminal to determine the speed state or both of the specified threshold information and a specified number of equivalent cells;

determining the speed state and the cell type according to the RRC information;

determining whether the speed state and the cell type meet a preset cell access condition or not; and initiating access to the cell to be accessed in response to determining that the speed state and the cell type meet the preset cell access condition, wherein:

the preset cell access condition comprises: the speed state being a high speed state and the cell type being the cell served by a high-speed railway dedicated network, or the speed state being a low speed state and the cell type being the cell of a LTE network, initiating access to the cell to be accessed in response to determining that the speed state and the cell type meet preset the cell access condition comprises:

initiating the access to the cell to be accessed in response to determining that the speed state is the high speed state and the cell type is the cell served by the high-speed railway dedicated network; and initiating the access to the cell to be accessed in response to determining that the speed state is the low speed state and the cell type is the cell of the LTE network, and determining the speed state and the cell type according to the RRC information comprises:

determining the speed state according to the specified threshold information;

determining, in response to that the RRC information comprises only the specified threshold information, the cell type being the cell of the LTE network; and determining, in response to that the RRC information comprises both of the specified threshold information and the specified number of equivalent cells, the cell type being the cell served by the high-speed railway dedicated network according to the specified number of equivalent cells.

10. The cell access method according to claim 9, wherein the specified number of equivalent cells is a number of equivalent cells corresponding to the cell to be accessed, and the specified number of equivalent cells is configured to instruct the terminal to determine that the cell type is the cell served by the high-speed railway dedicated network;
wherein the step of determining the speed state and the cell type according to the RRC information further comprises:
replacing a number of reselection times of the cell to be accessed with the specified number of equivalent cells when determining the cell type being the cell served by the high-speed railway dedicated network according to the specified number of equivalent cells.

11. The cell access method according to claim 9, wherein the specified threshold information comprises a specified duration for evaluating the speed state, a first number range of cell reselection times corresponding to the high speed state and a second number range of cell reselection times corresponding to the low speed state, and
the step of determining the speed state according to the specified threshold information further comprises:
obtaining a number of the cell reselection times of the terminal within the specified duration;
determining the speed state as the high speed state when the number of the cell reselection times is within the first number range of cell reselection times; and
determining the speed state as the low speed state when the number of the cell reselection times is within the second number range of cell reselection times.

12. The cell access method according to claim 11, wherein:
the specified threshold information further comprises a third number range of cell reselection times corresponding to a medium speed state, and
the step of determining the speed state according to the specified threshold information further comprises:
determining the speed state as the medium speed state when the number of the cell reselection times is within the third number range of cell reselection times.

13. The cell access method according to claim 9, wherein:
the preset cell access condition further comprise: the speed state being a medium speed state and the cell type being the cell served by the high-speed railway dedicated network, and
the step of initiating access to the cell to be accessed in response to determining that the speed state and the cell type meet the preset cell access condition further comprises:
initiating the access to the cell to be accessed in response to determining that the speed state is the medium speed state and the cell type is the cell served by the high-speed railway dedicated network.

14. The cell access method according to claim 9, further comprising:
determining not to initiate the access to the cell to be accessed in response to determining that the speed state and the cell type do not meet the preset cell access condition.

15. A non-transitory computer-readable storage median having a computer program stored thereon, wherein the computer program, when being executed by a processor, causes the processor to perform the cell access method according to claim 9.

16. A terminal, comprising:
a processor; and
a memory for storing executable instructions of the processor that, when being executed by the processor, cause the processor to implement a cell access method comprising,
receiving RRC information sent by a base station, wherein the RRC information is configured to instruct a terminal to determine a speed state of the terminal and a cell type of a cell to be accessed, and the RRC information comprises only specified threshold information for instructing the terminal to determine the speed state or both of the specified threshold information and a specified number of equivalent cells:
determining the speed state and the cell type according to the RRC information;
determining whether the speed state and the cell type meet a preset cell access condition or not; and
initiating access to the cell to be accessed in response to determining that the speed state and the cell type meet the preset cell access condition,
wherein:
the preset cell access condition comprises: the speed state being a high speed state and the cell type being the cell served by a high-speed railway dedicated network, or the speed state being a low speed state and the cell type being the cell of a LTE network,
initiating access to the cell to be accessed in response to determining that the speed state and the cell type meet preset the cell access condition comprises:
initiating the access to the cell to be accessed in response to determining that the speed state is the high speed state and the cell type is the cell served by the high-speed railway dedicated network; and
initiating the access to the cell to be accessed in response to determining that the speed state is the low speed state and the cell type is the cell of the LTE network, and
determining the speed state and the cell type according to the RRC information comprises:
determining the speed state according to the specified threshold information;
determining, in response to that the RRC information comprises only the specified threshold information, the cell type being the cell of the LTE network; and
determining, in response to that the RRC information comprises both of the specified threshold information and the specified number of equivalent cells, the cell type being the cell served by the high-speed railway dedicated network according to the specified number of equivalent cells.

* * * * *